UNITED STATES PATENT OFFICE.

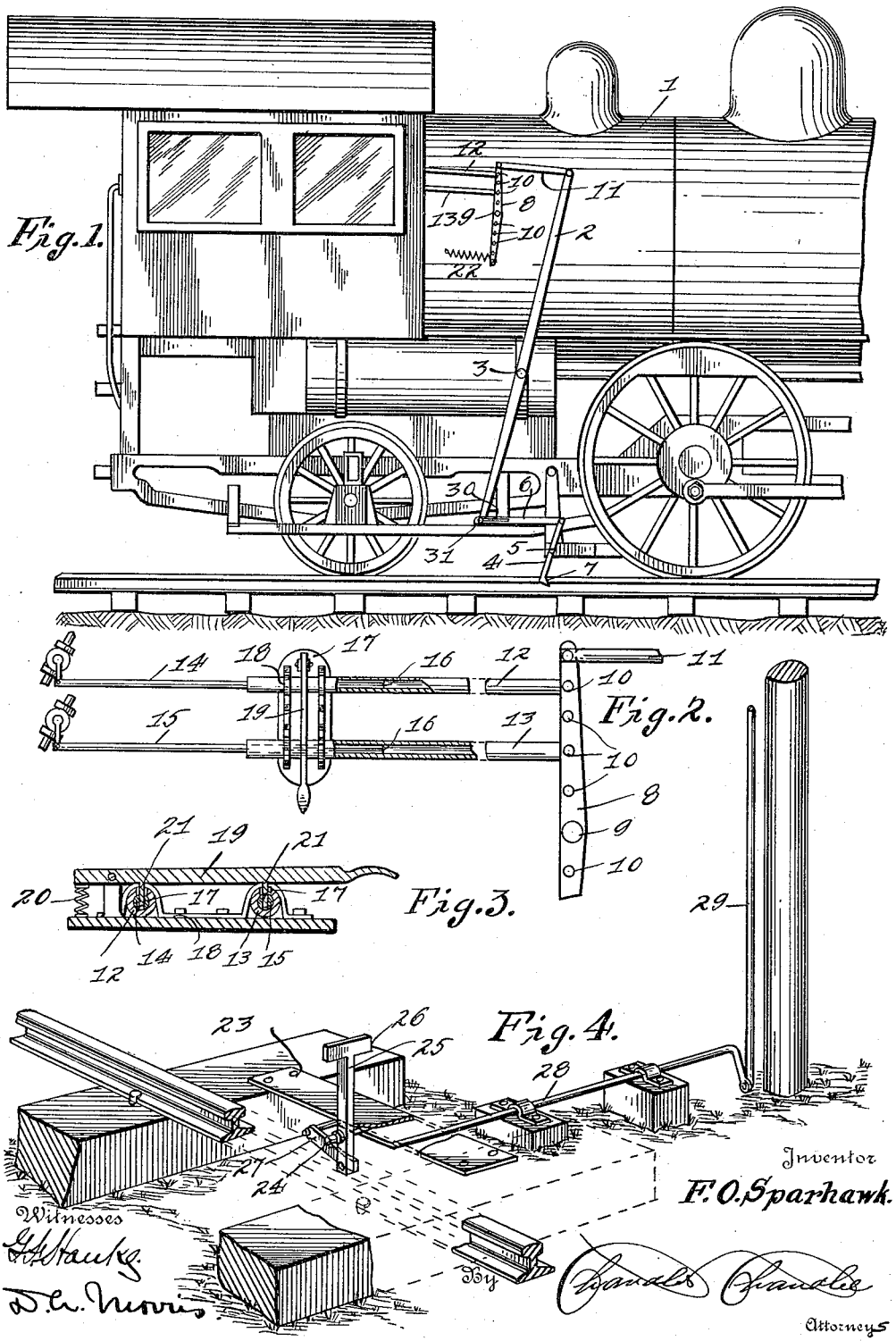

FRANK O. SPARHAWK, OF PAINTER, WYOMING.

AUTOMATIC TRAIN-STOP.

1,161,743.

Specification of Letters Patent.

Patented Nov. 23, 1915.

Application filed August 6, 1915. Serial No. 44,103.

*To all whom it may concern:*

Be it known that I, FRANK O. SPARHAWK, a citizen of the United States, residing at Painter, in the county of Park, State of Wyoming, have invented certain new and useful Improvements in Automatic Train-Stops; and I do hereby declare the following to be a full, clear, and exact description of the invention, such as will enable others skilled in the art to which it appertains to make and use the same.

This invention relates to an automatic train stop.

An object of the invention resides in the provision of a device which will be operable to close the steam valve and apply the air brakes simultaneously and which may be actuated by a trip controlled by a semaphore signal.

A further object of the invention resides in so constructing the device that the steam and air valves may be manually operated, independently.

A further object of the invention resides in the provision of means for rendering the device inoperative.

With these and other objects in view such as will appear as my description progresses, my invention comprises the combination and arrangement of parts as set forth in and falling within the scope of the appended claim.

In the drawing: Figure 1 is an elevational view of my device showing the same mounted upon a locomotive, the locomotive being shown conventionally and only a portion thereof being illustrated; Fig. 2 is an enlarged sectional view of my device taken in a plane longitudinally of the operating rods; Fig. 3 is a transverse sectional view showing the manner of mounting the locking lever; Fig. 4 is a fragmental detail showing the trip engaging member.

Referring to the drawing wherein like parts are indicated by like characters throughout the several views: in the drawing I have illustrated a portion of a locomotive 1 on which is pivotally mounted a lever 2, at 3. A trip lever 4 is pivotally mounted at 5 and is connected to the lower end of the lever 2, pivotally, by a link 6. This trip lever 4 has a projecting finger 7 on the lower end thereof for a purpose which will later appear. Mounted above and in spaced relation to the pivotal point of the lever 2 is a lever 8 which is pivoted at 9 between its ends and is provided with a plurality of apertures 10 on each side of its pivotal point. This lever is connected to the upper end of the lever 2 by a link 11. Thus it will be seen that as the trip lever 4 is moved about its pivot the lever 8 will be moved.

In order that the movement of the lever 8 may actuate the throttle and air valves, I have mounted a pair of tubular members 12 and 13 upon the lever 8 which are adjustable on the said lever 8 and held in place by bolts passing through the apertures 10. These tubular members are made adjustable upon the lever 8 so that the relative throw may be varied as necessitated by the differences in structure of the various locomotives. Furthermore they are made adjustable above and below the pivotal point of the lever 8 so that they may be adjusted to engines of various types.

Slidably mounted in the tubular members 12 and 13 are rods 14 and 15, the former being connected to the throttle valve and the latter to the air brake valve. These rods are provided with slots 16 which extend longitudinally thereof and are located within the tubular members 12 and 13. These tubular members pass over a plate 17 to which they are held by means of strap irons 18. Pivotally mounted on this plate 17 is a lever 19, the free end of which is normally pressed toward the plate 17 by a coil spring 20. This lever 19 is provided with a pair of pins 21 which extend through holes in the tubular members 12 and 13 and into the slots 16 in the rods 14 and 15. Thus the said tubular members and rods may have independent movement in directions away from each other and they may have concurrent movement in one direction because of the fact that the pins 21 will engage the ends of the slots 16. A coil spring 22 is secured to the lower end of the lever 8 and is adapted to return the parts to their initial positions after they have been actuated. Thus it will be seen that when the lever 8 is actuated the rods 14 and 15 will be moved and the throttle and air valves operated to stop the locomotive. Now these valves may be actuated independently, manually, by means of the ordinary valve levers as the pins 21 will ride in the slots 16. The lever 19 may be moved about its pivot to withdraw the pins 21 from the slots 16 at which time the movement of the lever 8 will have no effect upon the valves but the tubular members 12 and 13 will ride idly over the rods 14 and 15 respectively.

In order that the tripping lever may be actuated, I have provided a plate 23 which is adapted to be secured to the cross ties of the track. Pivotally mounted on an extension 24 of this plate is an arm 25 which has a transversely extending head 26 on the upper end thereof with which the tripping lever 4 is adapted to engage. A rod 27 is secured to the lower end of this arm 25 and is connected to an angular lever 28 which is operated by means of a rod 29 connected to the semaphore signal so that the arm 25 may be raised into a vertical position where it will be engaged by the tripping lever 4 or into a horizontal position where it will be out of the path of movement of the said tripping lever. The link 6 is provided with a longitudinally extending slot 30 into which the pin 31 which connects it pivotally to the lever 2 is adapted to slide so that when the locomotive is going backwardly, the engagement and movement of the tripping lever will slide the link 6 upon the said pin 31 and will therefore not operate the valve.

From the foregoing description it will be seen that I have provided a very simple and efficient train stopping device which is easily operated and which may be readily installed.

While I have illustrated and described a particular embodiment of my invention, it has merely been for the sake of convenience and I do not wish to be limited to that particular embodiment as it is obvious that numerous changes may be made within the scope of the appended claim.

What I claim is:—

In a train stopping device, the combination with a pair of tubular members, of a pair of rods extending into the same and slidable therein, the said rods having slots therein, a plate mounted on the tubular members, a lever mounted on the plate and having pins extending through the tubular members and into the slots in the rods and resilient means for maintaining the pins in such position.

In testimony whereof, I affix my signature, in the presence of two witnesses.

FRANK O. SPARHAWK.

Witnesses:
BESSIE E. SPARHAWK,
HEBER H. WARD.

Copies of this patent may be obtained for five cents each, by addressing the "Commissioner of Patents, Washington, D. C."